United States Patent
Oman

(10) Patent No.: US 8,059,558 B2
(45) Date of Patent: Nov. 15, 2011

(54) CONFIGURATION PREPROCESSOR LANGUAGE

(75) Inventor: Andreas Oman, Stockholm (SE)

(73) Assignee: PacketFront International AB (SE)

( * ) Notice: Subject to any disclaimer, the term of this patent is extended or adjusted under 35 U.S.C. 154(b) by 72 days.

(21) Appl. No.: 12/532,476

(22) PCT Filed: Mar. 20, 2008

(86) PCT No.: PCT/EP2008/053374
§ 371 (c)(1),
(2), (4) Date: Mar. 4, 2010

(87) PCT Pub. No.: WO2008/113854
PCT Pub. Date: Sep. 25, 2008

(65) Prior Publication Data
US 2010/0150025 A1    Jun. 17, 2010

(30) Foreign Application Priority Data
Mar. 22, 2007  (EP) ................. 07104707

(51) Int. Cl.
*G01R 31/08* (2006.01)
(52) U.S. Cl. ......... 370/252; 370/401; 370/352; 709/220
(58) Field of Classification Search .......... 370/352, 370/401, 252; 709/220
See application file for complete search history.

(56) References Cited

U.S. PATENT DOCUMENTS

| | | | |
|---|---|---|---|
| 5,802,042 A | 9/1998 | Natarajan et al. | |
| 5,832,503 A | 11/1998 | Malik et al. | |
| 5,913,037 A | 6/1999 | Spofford et al. | |
| 6,059,614 A | 5/2000 | Shelby et al. | |
| 6,222,852 B1 | 4/2001 | Gandy | |
| 6,393,472 B1 | 5/2002 | Anerousis et al. | |
| 6,560,236 B1 | 5/2003 | Varghese et al. | |
| 6,680,945 B1 | 1/2004 | Merchant et al. | |
| 6,769,124 B1 | 7/2004 | Schoening et al. | |
| 6,876,667 B1 | 4/2005 | Synnestvedt et al. | |
| 6,885,657 B1 | 4/2005 | Rabenko et al. | |

(Continued)

FOREIGN PATENT DOCUMENTS

EP    1 039 698    9/2000

(Continued)

OTHER PUBLICATIONS

International Search Report and Written Opinion for PCT/EP2008/056565, mailed Jan. 19, 2009.

(Continued)

*Primary Examiner* — Duc C Ho
(74) *Attorney, Agent, or Firm* — Faegre & Benson LLP

(57) ABSTRACT

A system includes network elements and a network provisioning and control system by which connection of network elements to a broadband network is controlled. The network provisioning and control system includes a configuration rendering engine that operates to configure the network elements connected to the network. Network element configuration templates are stored in the network provisioning and control system, each template including predetermined configuration data and conditional configuration data. A network element connected to the network and requiring configuration is detected and a template relating to the specific network element to be configured is determined. The system is interrogated. A configuration statement for the network element based on the selected template is determined using the predetermined configuration data and the determined, discrete values of the conditional configuration data. The network element is configured using the configuration statement.

11 Claims, 4 Drawing Sheets

U.S. PATENT DOCUMENTS

| | | | |
|---|---|---|---|
| 7,054,309 B1 | 5/2006 | Hoot et al. | |
| 7,082,463 B1 | 7/2006 | Bradley et al. | |
| 7,099,158 B1 | 8/2006 | Bjorklund | |
| 7,139,818 B1 | 11/2006 | Kinnear, Jr. et al. | |
| 7,200,145 B1 | 4/2007 | Edsall et al. | |
| 7,801,133 B2 * | 9/2010 | Siegel | 370/390 |
| 7,826,463 B2 * | 11/2010 | Patel et al. | 370/401 |
| 2002/0023174 A1 | 2/2002 | Garrett et al. | |
| 2002/0075844 A1 | 6/2002 | Hagen | |
| 2002/0161801 A1 | 10/2002 | Hind et al. | |
| 2003/0039249 A1 | 2/2003 | Basso et al. | |
| 2003/0056225 A1 | 3/2003 | Bione | |
| 2003/0131107 A1 | 7/2003 | Godse et al. | |
| 2003/0200285 A1 | 10/2003 | Hansen et al. | |
| 2004/0017829 A1 | 1/2004 | Gray et al. | |
| 2004/0049568 A1 | 3/2004 | Nguyen et al. | |
| 2004/0090965 A1 | 5/2004 | Lin | |
| 2004/0172412 A1 | 9/2004 | Files et al. | |
| 2004/0213152 A1 | 10/2004 | Matuoka et al. | |
| 2004/0258074 A1 | 12/2004 | Williams et al. | |
| 2004/0261116 A1 * | 12/2004 | Mckeown et al. | 725/109 |
| 2005/0049886 A1 | 3/2005 | Grannan et al. | |
| 2005/0286517 A1 | 12/2005 | Babbar et al. | |
| 2006/0026228 A1 | 2/2006 | Kim | |
| 2006/0277603 A1 | 12/2006 | Kelso et al. | |
| 2007/0058638 A1 | 3/2007 | Guichard et al. | |
| 2007/0174522 A1 | 7/2007 | Lee | |
| 2007/0203999 A1 | 8/2007 | Townsley et al. | |

FOREIGN PATENT DOCUMENTS

| | | |
|---|---|---|
| EP | 1780941 | 5/2007 |
| GB | 2 069 767 | 1/1981 |
| KR | 2001/0038481 | 5/2001 |
| WO | WO 00/60864 | 10/2000 |
| WO | WO 02/35797 | 5/2002 |
| WO | WO 2008/068316 | 6/2008 |
| WO | WO 2008/113852 | 9/2008 |
| WO | WO 2008/113854 | 9/2008 |
| WO | WO 2009/019300 | 2/2009 |
| WO | WO 2009/027513 | 3/2009 |
| WO | WO 2009/035719 | 3/2009 |
| WO | WO 2009/047215 | 4/2009 |
| WO | WO 2009/047334 | 4/2009 |
| WO | WO 2009/047345 | 4/2009 |

OTHER PUBLICATIONS

European Search Report issued in EP Application 07104707, Publication 1973269, dated Aug. 27, 2007, 7 pages.

Bodzinga, Anne, et al., "Interworking IPTV Services with IMS", Telecommunications Network Strategy and Planning Symposium 2006 pp. 1-5.

Cohen, Reuven, et al., "Video-on-Demand Session Management", IEEE Journal on Selected Areas in Communications vol. 14, No. 6.

European Search Report issued in EP Application 06125497, Publication 1931085, mailed Jan. 9, 2009, 8 pages.

International Search Report and Written Opinion for PCT/EP2008/053369, mailed Jul. 2, 2008, 10 pages.

International Search Report and Written Opinion for PCT/EP2008/060384, mailed Nov. 11, 2008, 10 pages.

International Search Report and Written Opinion for PCT/EP2008/061403, mailed Dec. 18, 2008, 12 pages.

International Search Report and Written Opinion for PCT/EP2007/063467, mailed Mar. 4, 2008, 7 pages.

International Search Report and Written Opinion for PCT/EP2008/056563, mailed Aug. 21, 2008, 11 pages.

International Search Report for PCT/EP2008/063667, mailed Jul. 30, 2009, 3 pages.

International Search Report for PCT/EP2008/063639, mailed Oct. 1, 2009, 2 pages.

International Search Report for PCT/EP2008/063270, mailed Jan. 21, 2009, 3 pages.

International Search Report for PCT/EP2008/053374, mailed Sep. 25, 2009, 3 pages.

* cited by examiner

CONFIGURATION PREPROCESSOR LANGUAGE

CROSS-REFERENCE TO RELATED APPLICATIONS

The present application is a national phase application of PCT application PCT/EP/2008/053374 filed pursuant to 35 U.S.C. §371, which claims priority to EP 07104707.0 filed Mar. 22, 2007. Both applications are incorporated herein by reference in their entirety.

TECHNICAL FIELD

This invention relates to methods for configuring network elements in a broadband network.

BACKGROUND ART

FIG. 1 shows a generic description of a broadband network for providing telephone, internet and TV/video services to subscribers in a number of locations. A series of service providers provide the various services (SP1, SP2, SP3) to the network 10 via conventional access points 12. The network 10 provides connects these to subscribers via routers 14 located close to the subscribers. These can include business locations that can include routers in commercial property 16, and domestic subscribers with routers located in a central office 18 for a neighbourhood of separate dwellings (houses 17), or in a single building 19 such as an apartment building. The network operator manage the network function by the use of a control and provisioning system 20.

From time to time, it is necessary to make changes to the network by adding or reconfiguring elements making up the system, for example the routers 14. This configuration is achieved by downloading the configuration data from the control and provisioning system 20 to the router 14. The configuration data is contained in templates that are stored in a database forming part of the control and provisioning system 20. However, problems can arise due to the large number of network elements in use and their ever changing nature. If a new router (or, more likely, a revised version of an existing router) is deployed into the network and there is no configuration template that matches it exactly, the configuration can fail. Reconfiguration in such cases often requires manual intervention with the associated cost and delay.

In many cases, the reason for failure can be that certain parameters relating to a router vary without making substantial changes to functionality. For example, the name may change to indicate a new version. If the configuration template specifies the old name, it may not operate properly to configure the latest version even though it is functionally identical since the parameters on the router will not match the values in the template.

It is an object of the invention to provide a system which does not require discrete templates to be stored in the control and provisioning system for all network elements but which can create configuration statements according to data that can be retrieved from the system.

DISCLOSURE OF THE INVENTION

This invention provides a method of configuring network elements in a system comprising network elements and a network provisioning and control system by which connection of network elements to a broadband network is controlled, the network provisioning and control system including a configuration rendering engine that operates to configure the network elements connected to the network, the method comprising:

storing network element configuration templates in the network provisioning and control system, each template comprising predetermined configuration data and conditional configuration data;

detecting a network element connected to the network and requiring configuration;

determining the template relating to the specific network element to be configured;

interrogating the system to determine discrete values for the conditional configuration data;

preparing a configuration statement for the network element based on the selected template using the predetermined configuration data and the determined, discrete values of the conditional configuration data; and configuring the network element using the configuration statement.

The conditional configuration data can be static data such as data relating to the particular type of network equipment (name, model, version, etc.), the type of connection (DSL, optical fibre, etc.), connection port, end user equipment etc. The conditional data can also be temporal, indicative of a time varying parameter, such as a time-limited connection, current port status, etc.

The method can also comprise capturing data relating to the system during operation and using the system operation data to determine discrete values for the conditional configuration data.

Data relating to the status of the interface or port to which an element is attached can be used to provide configuration data, including aspects such as signal to noise ratio, latency, etc.

The method according to the invention avoids the need to have discrete templates for every type of network element. This reduces the possibility of there being no template available when a device is to be configured.

MODE(S) FOR CARRYING OUT THE INVENTION

Figure 1:
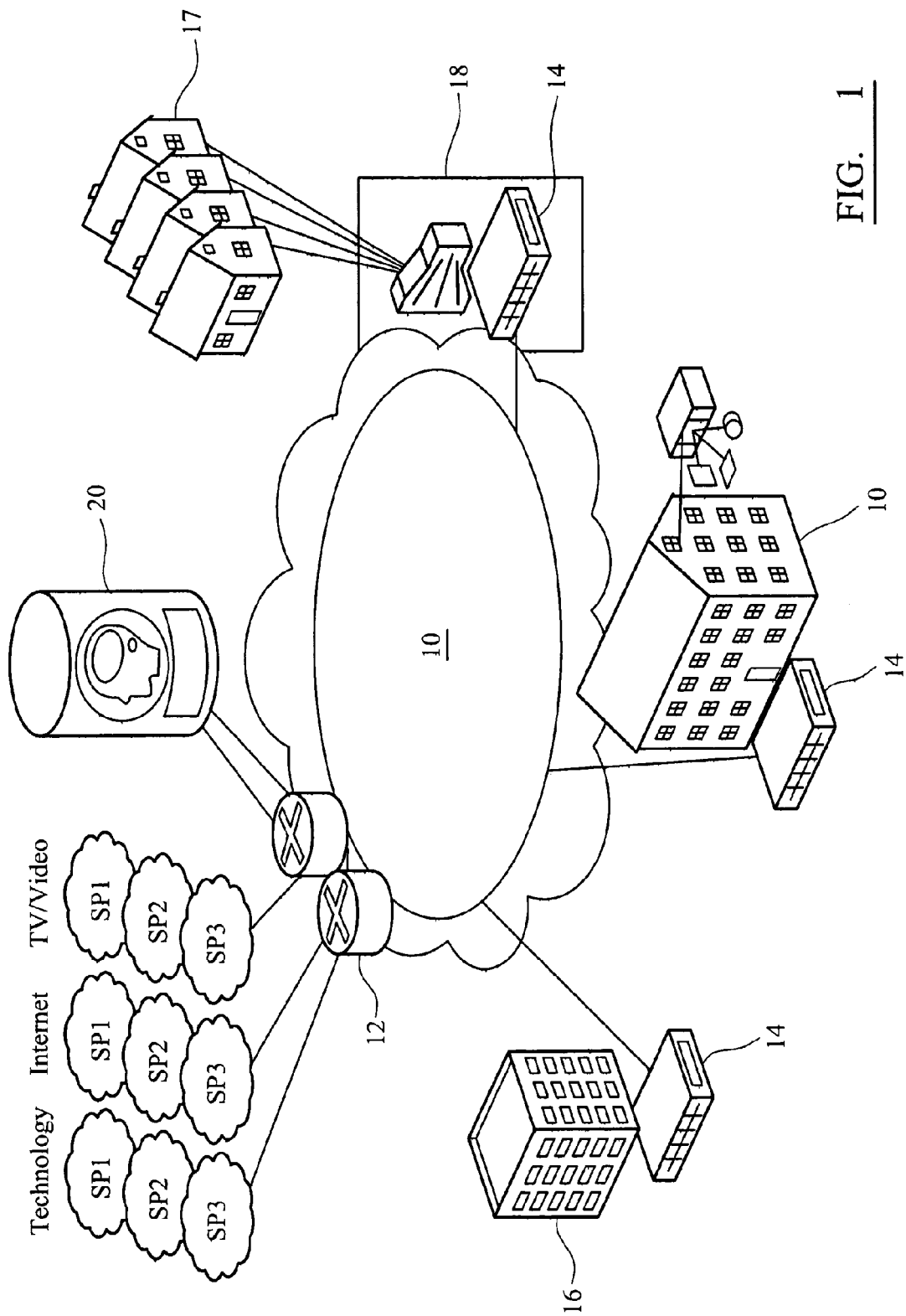
FIG. 1 shows a schematic view of a broadband network in which the invention can operate.

A network system in which the invention operates is shown in FIG. 1. Operation of the network 10 is controlled by a control and provisioning system 20 that configures the various elements of the network to operate in the desired manner.

Figure 2:
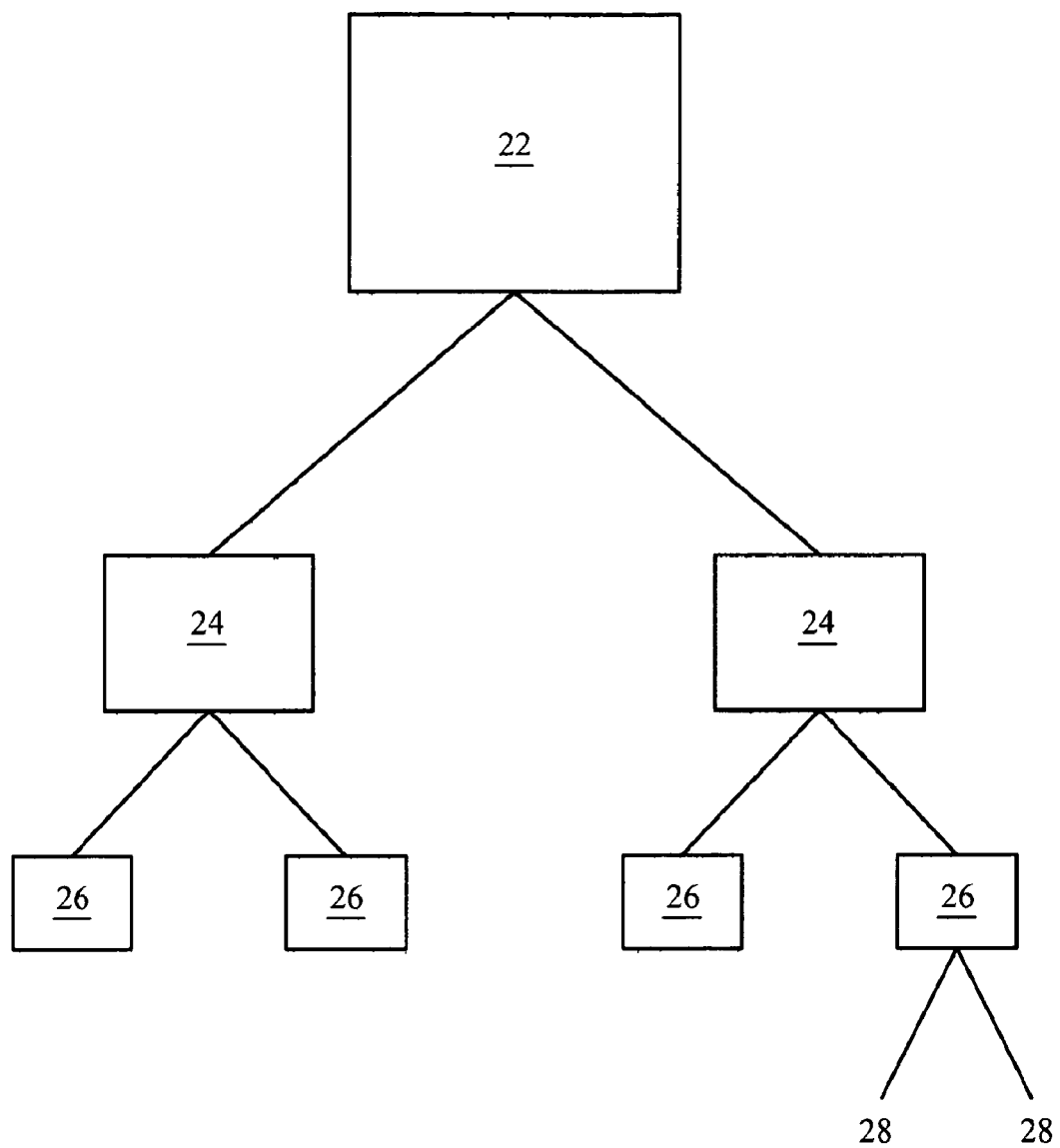
FIG. 2 shows a functional block diagram of a network.

For the function of the control and provisioning system 20, the network can be considered in an abstract way as comprising a core 22 having one or more cells 24, each cell having one or more network elements 26 as is shown in FIG. 2. Subscribers 28 connect to the network elements 26. This structure is not to be confused with the physical elements making up the network. The functional blocks 22, 24, 26 may be wholly or partly resident in the same or different physical elements, depending on the exact size and makeup of the network in question, although typically, each network element 26 will comprise a router.

Figure 3:
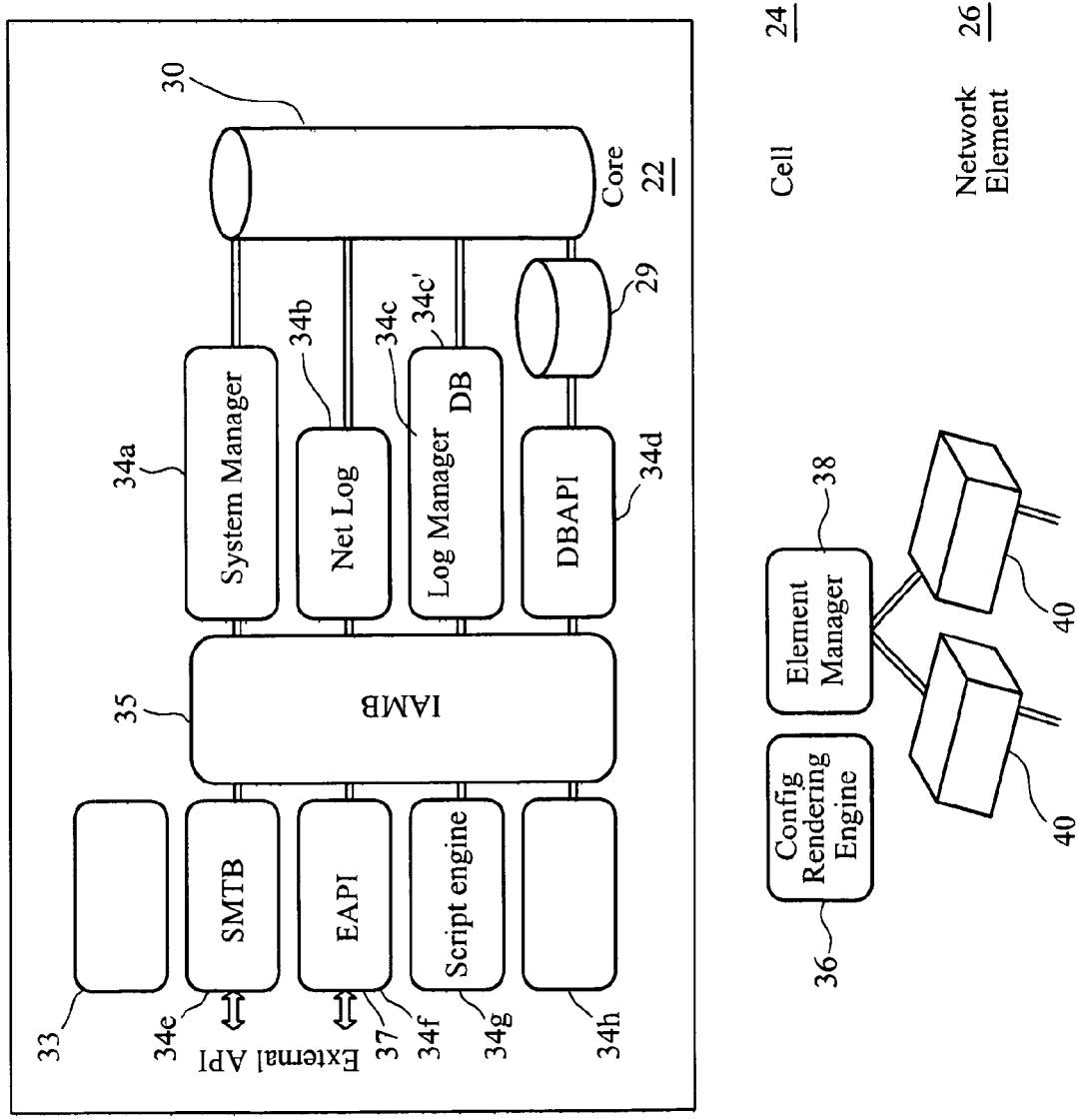
FIG. 3 shows a system suitable for implementing the invention.

FIG. 3 shows a system suitable for implementing the invention. This system is described in more detail in European patent application 05077477.7. The core 22 comprises a file system 30, a database 32, a core module element manager 33, and a set of modules 34a-h that provide the core services for the network. The file system 30, database 32 and modules 33, 34 are all located on a central server, although it is possible that the various components could be distributed over more than one server. The core modules 34 interact with each other, the cells 24 and network elements 26. The core 22 also interacts with external applications such as service provider systems via an external API 37. The core modules 34 comprise a system manager module 34a, a net log module 34b, a log manager module 34c, a database application interface 34d, a subscriber management tool bridge 34e, an external application interface 34f, a script engine 34g, and a configuration job manager 34h. The various core modules 34 communicate with each other via an inter-application message bus 35. Each cell 24 comprises modules that handle that part of the network topology in that cell. The cell 24 can be located on the same server as the core 22, but in the case of a large network, the cell 24 may be separated from the core server and deployed in the network. Each cell includes a configuration rendering engine module 36 and an element manager module 38. Each network element 26 typically comprises a programmable router 40.

Figure 4:
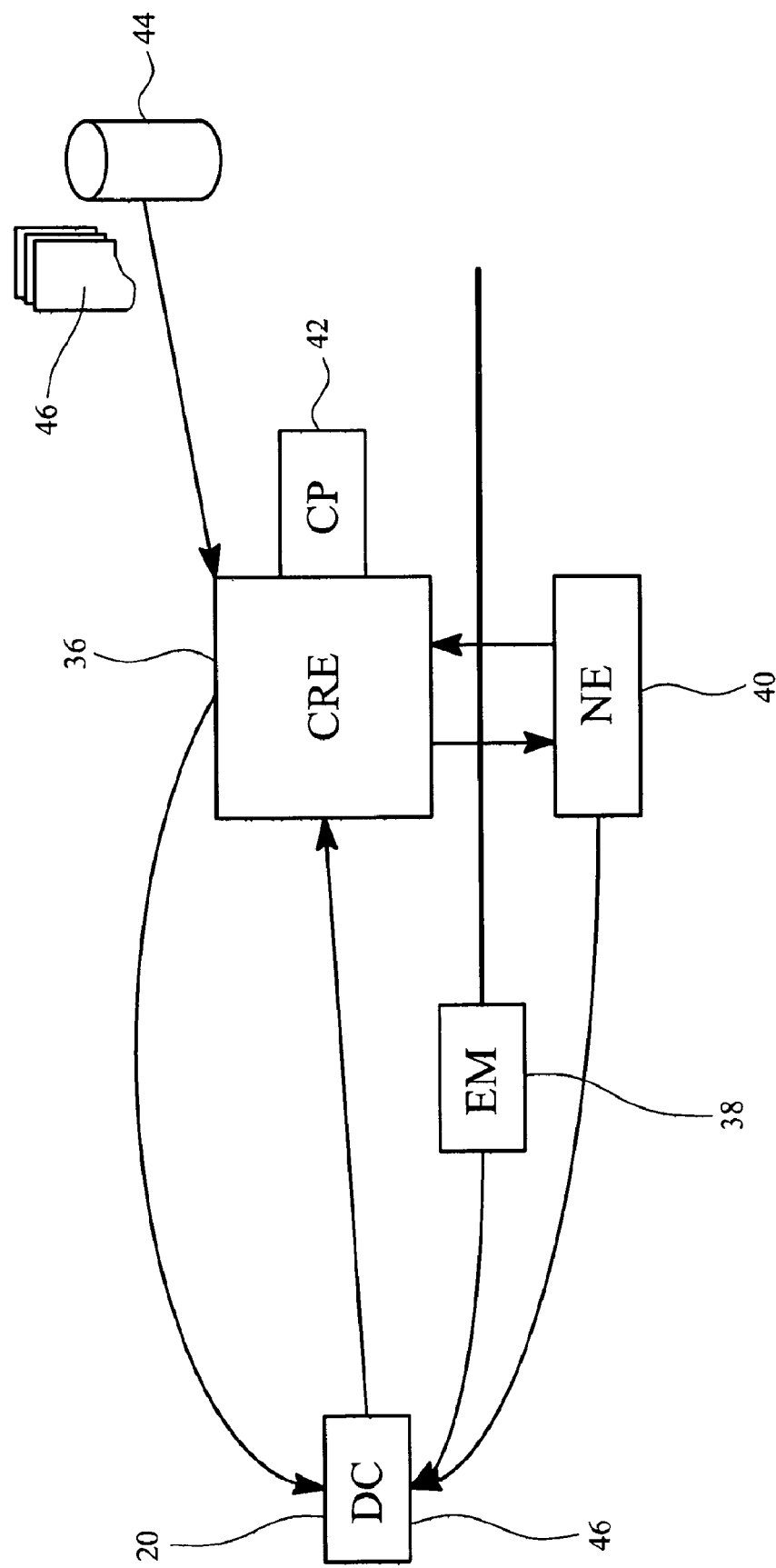
FIG. 4 shows a schematic view of data flow in a system according to the invention.

The invention primarily forms part of the configuration rendering engine 36. The relevant part of the system shown in FIGS. 2 and 3 is shown schematically in FIG. 4.

The following example considers connection of a new router 40 to the call 24. On connection and powering up of the new network element 40, the element manager 38 detects the presence of the new hardware and invokes operation of the configuration rendering engine (CRE) 36. The CRE 36 includes an embodiment of the invention known as configuration pre-processor language (CPL) 42. The CRE 36 sends a message x to the element 40 to return various data y. On receipt of this data, the CRE 40/CPL 42 interrogates a configuration template database 44 to obtain an appropriate configuration template 46. The templates 46 contain predetermined configuration data (i.e. data that are fixed for the device in question) and conditional configuration data (i.e. data that are dependent on returned values following interrogation of the system).

The predetermined configuration data can be the same as are used in prior art configuration templates. The conditional configuration data can be static and/or temporal data. Examples of static conditional configuration data can be data such as the name, model or version of the network element 40, the link speed to be assigned, etc. These are data that will not change for any configuration of the element 40. Temporal configuration data are dynamic data that can vary during the operation of the element 40. these can include parameters that must be determined at the time of configuration, such as the nature of end user equipment (not shown) attached to the router 40, data relating to the interface/ports status such as signal to noise ratio, latency. Other types of temporal or dynamic data include time, for use in establishing time-limited configurations or the like.

The configuration template is populated with data to create a configuration statement that is sent from the CRE 36 via the element manager 38, to the element 40.

In a further embodiment of the invention, a data capture engine (DCE) 48 is included in the system 20. This operates to receive data from the various parts of the system during operation. Thus it can provided statistical data which can also be used for creation of the configuration statement.

By using conditional data in the preparation of the configuration statement, it is possible for the system to adapt to changes in the configuration parameters of the network element without the need for a new template to be created. It also allows time-limited data or configurations to be used.

While the invention is described above in relation to connection of a new network element, it can equally be applied to re-configuration of an existing element, such as following a restart, or on commencement of new system capabilities.

The invention claimed is:

1. A method of configuring network elements in a system comprising network elements and a network provisioning and control system by which connection of network elements to a broadband network is controlled, the network provisioning and control system including a configuration rendering engine that operates to configure the network elements connected to the network, the method comprising:
   storing network element configuration templates in the network provisioning and control system, each template comprising predetermined configuration data and conditional configuration data;
   detecting a network element connected to the network and requiring configuration;
   determining the template relating to the specific network element to be configured;
   interrogating the system to determine discrete values for the conditional configuration data;
   preparing a configuration statement for the network element based on the selected template using the predetermined configuration data and the determined, discrete values of the conditional configuration data; and
   configuring the network element using the configuration statement.

2. A method as claimed in claim 1, wherein the conditional configuration data comprise static data including one or more of data relating to the particular type of network equipment, the type of connection, the connection port, or end user equipment.

3. A method as claimed in claim 2, wherein the conditional data comprise temporal data that is indicative of one or more time varying parameters relating to the configuration.

4. A method as claimed in claim 2, wherein the configuration data comprise data relating to a status of the interface or port to which an element is attached.

5. A method as claimed in claim 2, further comprising capturing data relating to the system during operation and using the captured system operation data to determine discrete values for the conditional configuration data.

6. A method as claimed in claim 1, wherein the conditional data comprise temporal data that is indicative of one or more time varying parameters relating to the configuration.

7. A method as claimed in claim 6, wherein the configuration data comprise data relating to a status of the interface or port to which an element is attached.

8. A method as claimed in claim 6, further comprising capturing data relating to the system during operation and using the captured system operation data to determine discrete values for the conditional configuration data.

9. A method as claimed in claim 1, wherein the configuration data comprise data relating to a status of the interface or port to which an element is attached.

10. A method as claimed in claim 9, further comprising capturing data relating to the system during operation and using the captured system operation data to determine discrete values for the conditional configuration data.

11. A method as claimed in claim 1, further comprising capturing data relating to the system during operation and using the captured system operation data to determine discrete values for the conditional configuration data.

* * * * *